United States Patent [19]
Miyaguchi

[11] Patent Number: 5,079,664
[45] Date of Patent: Jan. 7, 1992

[54] MAGNETIC HEAD WITH A LAMINATED MAGNETIC FILM THICKER THAN A TRACK WIDTH

[75] Inventor: Satoshi Miyaguchi, Saitama, Japan

[73] Assignee: Pioneer Electronic Corporation, Tokyo, Japan

[21] Appl. No.: 374,801

[22] Filed: Jul. 3, 1989

[30] Foreign Application Priority Data

Jan. 31, 1989 [JP] Japan .................................. 1-19565

[51] Int. Cl.⁵ .................................................. G11B 5/147
[52] U.S. Cl. .................................................. 360/126
[58] Field of Search ................ 360/126, 119, 122, 125

[56] References Cited

U.S. PATENT DOCUMENTS

| | | | |
|---|---|---|---|
| 4,839,763 | 6/1989 | Matsuzawa | 360/126 |
| 4,868,698 | 9/1989 | Takahashi et al. | 360/126 |
| 4,894,742 | 1/1990 | Saito et al. | 360/126 |

FOREIGN PATENT DOCUMENTS

| | | | |
|---|---|---|---|
| 63-2109 | 1/1988 | Japan | 360/126 |
| 3079210 | 4/1988 | Japan | 360/126 |
| 63-214907 | 9/1988 | Japan . | |

Primary Examiner—A. J. Heinz
Assistant Examiner—Jefferson Evans
Attorney, Agent, or Firm—Sughrue, Mion, Zinn, Macpeak & Seas

[57] ABSTRACT

A thin film magnetic recording/reproducing head and a method of manufacturing same. The head is formed by sandwiching a multilayer thin film core between a pair of substrates, and removing a certain amount of the multilayer structure in the regions of the head which define the contact surface and the operational gap. The resulting structure has a thin film core which is thinner at the front core portion than is the back core portion. The method allows better alignment of two halves of the core portion in the vicinity of the operational gap.

2 Claims, 2 Drawing Sheets

MAGNETIC HEAD WITH A LAMINATED MAGNETIC FILM THICKER THAN A TRACK WIDTH

BACKGROUND OF THE INVENTION

The present invention relates to a magnetic head for an information recording/reproducing apparatus, such as a video tape recorder (VTR), a digital audio tape recorder (DAT), a floppy disk drive (FDD) and the like, which requires high density magnetic recording more particularly to a magnetic head which is suitable for mass-production even if the thickness of the core films defining a track width is varied.

Many kinds of magnetic heads for high density information recording/reproducing apparatus are widely known. For example, there is a magnetic head comprising a magnetic core composed of magnetic thin films which is sandwiched between a pair of non-magnetic substrates and defines a track width. With reference to FIG. 2, a manufacturing process and structure of such a magnetic head will be described. As shown in FIG. 2(A), a non-magnetic substrate 1, for example, crystallized glass or the like, is provided. Laminated films of magnetic material are layered on a surface of the substrate 1 by a thin film forming process, such as a sputtering or the like, so that the thickness of the core films 2 defines a track width as shown in FIG. 2(B). The non-magnetic substrate on which the core films are layered is cut along dotted lines as shown in FIG. 2(B). Thereafter, the divided substrates are layered on one another to form half core blocks 3A and 3B as shown in FIG. 2(C). The half core block 3B is provided with a groove 4 for lead wires. The core blocks 3A and 3B are attached to each other with the core films 2 being aligned with each other, to form a core block 5 as shown in FIG. 2(C). Thus, after cementing an operational gap 6 and a track width are formed. Thereafter, the core block 5 is sliced so that the core film 2 is sandwiched and a head chip 7, as shown in FIG. 2(D), is obtained. The head chip 7 functions as a magnetic core by the core films 2 to define the track width.

In the conventional magnetic head thus constructed, the core films sandwiched between a pair of non-magnetic substrates define the track width. One disadvantage is that the core films of the half core blocks 3A and 3B will be displaced from each other, as shown in FIG. 2(E), if the core film is formed non-uniformly on the non-magnetic substrate or the tracking misalignment errors occur in the attaching process. Another disadvantage is that the thickness of the magnetic thin films can not be selected to achieve the most suitable conditions of the magnetic characteristics.

SUMMARY OF THE INVENTION

An object of the present invention is to solve the above-described problems inherent in the conventional magnetic head. The magnetic head of the present invention can be produced in a mass-production process, which have no tracking misalignment errors.

The magnetic head according to the present invention comprises a magnetic core in which a core film of magnetic material sandwiched between a pair of non-magnetic substrates defines a track width, and is characterized in that the magnetic core includes a front magnetic core having an operational gap and a back magnetic core, the thickness of the front magnetic core being smaller than that of the back magnetic core.

DETAILED DESCRIPTION OF THE PREFERRED EMBODIMENT

Referring now to FIGS. 1(A) through 1(E), an embodiment according to the present invention will hereinafter be described.

Figure 1A:
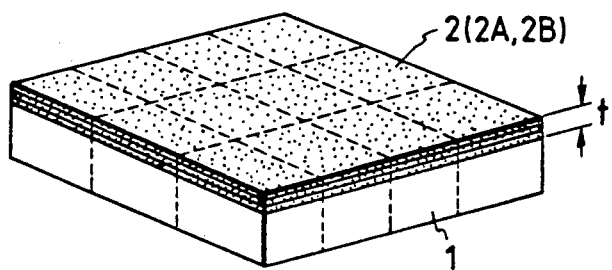
FIGS. 1(A) through 1(E) illustrate an embodiment of the present invention and a manufacturing process therefor.
Figure 1B:
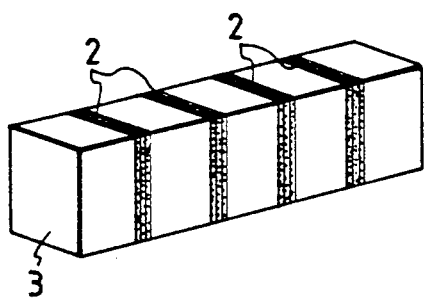
Figure 1C:
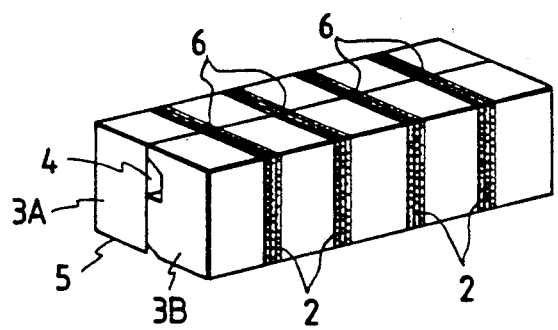
Figure 1D:
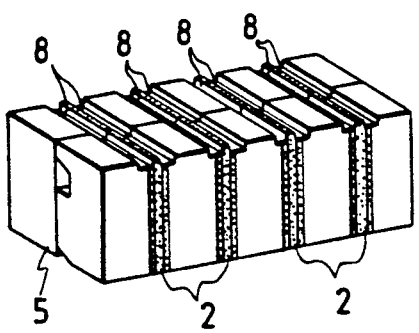
Figure 1E:
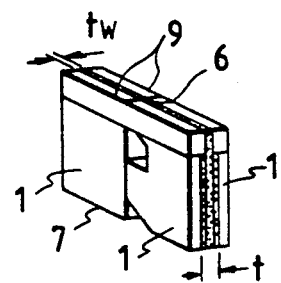
Figure 2A:
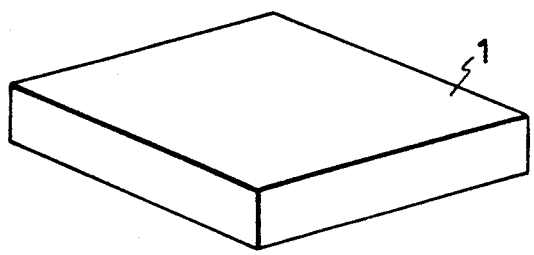
FIGS. 2(A) through 2(E) illustrate a conventional magnetic head and a manufacturing process therefor.
Figure 2B:
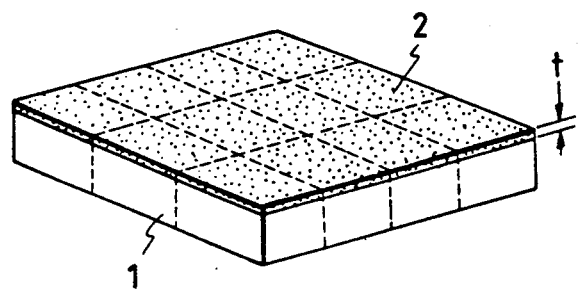
Figure 2C:
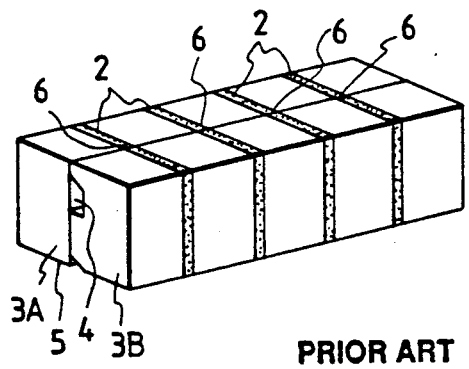
Figure 2D:
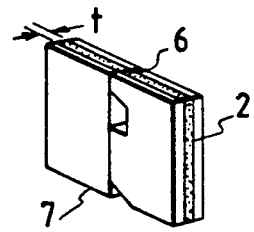
Figure 2E:
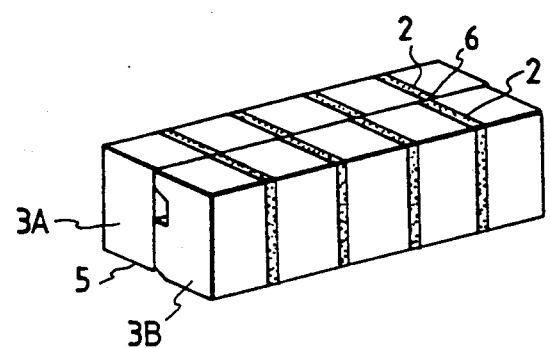

FIG. 1(E) illustrates a primary portion of a magnetic head according to one embodiment of the present invention. The head chip comprises a magnetic core in which core film 2 of magnetic material is sandwiched between, a pair of non-magnetic substrates 1 defines which define a track width tw. The magnetic core includes a front magnetic core having an operational gap 6 and a back magnetic core, wherein the thickness tw of the front magnetic core is smaller than the thickness t of the back magnetic core. The front magnetic core is clamped by glass portions 9 for reinforcement.

Referring to FIGS. 1(A)–1(D), a manufacturing method of the magnetic head according to the present invention will now be described.

A core film 2 of magnetic material such as Sendust is formed on a surface of a non-magnetic substrate 1, such as crystallized glass, by a thin film forming process, such as a sputtering process, as shown in FIG. 1(A). The core film 2 is formed in a multilayered structure composed of alternating layers of a magnetic material film 2A and an insulating film 2B. The total thickness of the multilayer core is defined as thickness t. As an example, each magnetic film layer 2A may have a thickness of 5 $\mu$m, and each layer 2B may have a thickness of 0.1 $\mu$m. As a specific example, the multilayer core film may consist of five magnetic films 2A and four insulating films 2B, resulting in a thickness of about 25 $\mu$m. The non-magnetic substrate 1 with the core film 2 therein is diced along the dotted lines of FIG. 1(A) to form sections of a predetermined size. Thereafter the diced substrate is layered to form a half core block 3 as shown in FIG. 1(B). A pair of such half core blocks 3A and 3B is provided. The half core block 3B is provided with a groove 4 for lead wires. Thereafter, the core blocks 3A and 3B are machined for example, by polishing the surfaces, particularly the surfaces of blocks 3A and 3B which will face each other and form the operation gap 6. The half core blocks 3A and 3B are then attached to each other so as to align the core films 2 with each other, respectively, so that a core block 5 is obtained as shown in FIG. 1(C).

An operational gap 6 is formed at the attaching surface of core films 2 of the core block 5. As an example, the gap may have a width of 0.2 $\mu$m. Subsequently, track width adjusting grooves 8 are formed, as shown in FIG. 1(D), in parallel with the core films 2 on the surface of the core block 5 which will contact a magnetic medium during recording/reproduction. The portion of the core films 2 having the track width tw and forming the operational gap therein is a front magnetic core portion. The portion of the core films 2 having a thickness t and forming the back gap opposed to the operational gap 6 is a back magnetic core portion.

The grooves 8 are formed by removing portions of the core film 2 as well as, in almost every case, portions of the substrate. As a result, even if the two blocks 3A and 3B are positioned to misalign the respective core multilayers 2, the resulting core layers 2 remaining and facing each other across the gap 6 after the grooving operation are completely aligned. This thinner, completely aligned portion, referred to as the front core portion includes the core portion which defines the operational gap and which is located on the surface contacting the magnetic medium during recording/reproduction. The rest of the core layer constitutes the back magnetic core portion.

The grooves 8 may be formed by using a dicing machine to remove a certain amount of the core and substrate. In a specific example, the groove may be 100 μm wide and have a depth of 50 μm. As a result, a multilayer core having a width t=25 μm may have a width tw=20 μm.

The track width adjusting groove 8 formed on the core block 5 is filled by glass 9. This may be carried out by melting a glass rod in an inert atmosphere (e.g.. Argon) at 700° C. for 20 minutes to fill the grooves. Thereafter, the core block 5 is sliced into a predetermined size so that a head chip 7 is obtained.

As has been described above, the magnetic head according to the present invention comprises a core film sandwiched between a pair of non-magnetic substrates. The core film includes a front magnetic core portion having an operational gap and a back magnetic core portion. The front magnetic core portion is thinner than the back magnetic core portion. Therefore it is possible to eliminate any non-uniformity in the thickness of the core film and to prevent the operational gap from being displaced at the surface. As a result, a magnetic head capable of mass-production and having good magnetic characteristics is obtained. Additionally, the laminated film thickness can be chosen without being restricted to the track width. Thus, the most effective magnetic core can be used.

What is claimed is:

1. A thin film magnetic head for recording/reproducing data on a magnetic medium, said magnetic head being of the type which has a thin film magnetic core sandwiched between a pair of non-magnetic substrates, an opening through said substrates and said thin film core, such that said core surrounding said opening defines a magnetic core circuit; said thin film core having an operational gap therein, constituting a front portion of said thin film core, which is adapted for use with the magnetic medium, a remaining portion of said thin film core not including said operational gap constituting a back portion, the improvement comprising:

said front core portion being thinner than said back core portion, wherein said thinner front core portion maintains a correct alignment of said thin film core across said operational gap, said thin film core having a multilayer construction of alternating magnetic and insulating thin film layers, with said front core portion consisting of fewer film layers than said back core portion, and said thin film core including one magnetic film and two insulating films, said thin film layers extending in a direction substantially perpendicular to a plane formed by said operational gap, said insulating films being shorter in length than said magnetic film, such that only said magnetic film includes said operational gap.

2. A thin film magnetic head as claimed in claim 1, wherein said substrate-core sandwich consists of two substantially equal halves attached to each other; the locus of attachment at said surface defining said operational gap.

* * * * *